United States Patent [19]
Cloud et al.

[11] Patent Number: 5,655,125
[45] Date of Patent: *Aug. 5, 1997

[54] REGISTER FOR IDENTIFYING PROCESSOR CHARACTERISTICS

[75] Inventors: Philip L. Cloud, Orangevale, Calif.; Dror Avni, Haifa, Israel

[73] Assignee: Intel Corporation, Santa Clara, Calif.

[*] Notice: The term of this patent shall not extend beyond the expiration date of Pat. No. 5,493,683.

[21] Appl. No.: 551,320

[22] Filed: Nov. 1, 1995

Related U.S. Application Data

[63] Continuation of Ser. No. 997,879, Dec. 29, 1992, Pat. No. 5,493,683.

[51] Int. Cl.⁶ .............................. G06F 1/18; G06F 1/32
[52] U.S. Cl. .......................................... 395/750.01
[58] Field of Search ................................ 395/750, 550; 364/707

[56] References Cited

U.S. PATENT DOCUMENTS

| | | | |
|---|---|---|---|
| 4,317,181 | 2/1982 | Teza et al. | 364/707 |
| 4,523,295 | 6/1985 | Zato | 395/440 |
| 4,748,559 | 5/1988 | Smith et al. | 395/750 |
| 4,758,945 | 7/1988 | Remedi | 395/750 |
| 4,841,440 | 6/1989 | Yonezu et al. | 395/750 |
| 4,870,570 | 9/1989 | Satoh et al. | 395/750 |
| 4,903,267 | 2/1990 | Arai et al. | 371/27 |
| 5,034,915 | 7/1991 | Styma et al. | 395/400 |
| 5,097,483 | 3/1992 | Bechtolsheim | 395/800 |
| 5,203,003 | 4/1993 | Donner | 395/800 |
| 5,220,671 | 6/1993 | Yamagishi | 395/750 |
| 5,230,074 | 7/1993 | Canova, Jr. et al. | 395/750 |
| 5,253,357 | 10/1993 | Allen et al. | 395/425 |
| 5,274,781 | 12/1993 | Gibart | 395/325 |

*Primary Examiner*—Ayaz R. Sheikh
*Attorney, Agent, or Firm*—Blakely, Sokoloff, Taylor & Zafman

[57] ABSTRACT

A power conservation apparatus in a computer system. This apparatus includes an identification register in a processor comprising a contents including a plurality of flags for identifying the characteristics of the processor. One of these characteristics may be whether the processor includes static logic devices. In such systems, the clock connected to the processor may be halted, without the corruption of data in the processor. Other characteristics may include whether the processor is clocked at the same rate as the system, or whether the processor may operate on a lower voltage power source. The apparatus further comprises a transmission circuit for transferring the contents of the identification register from the processor to a system coupled to the processor upon the receipt of a first code. The apparatus also comprises a reception circuit in the system for receiving the contents of the identification register, a storage circuit for storing the contents of the identification register, a determination circuit in the system for determining the contents of the storage circuit, such as a logic unit, and a clock halt circuit for stopping the clock. In this manner, various characteristics of the processor may be determined allowing the system to be reconfigured and power conserved appropriately.

11 Claims, 4 Drawing Sheets

REGISTER FOR IDENTIFYING PROCESSOR CHARACTERISTICS

This is a continuation of application Ser. No. 07/997,879, filed Dec. 29, 1992 U.S. Pat. No. 5,493,683.

BACKGROUND OF THE INVENTION

1. Field of the Invention

The present invention relates to the field of integrated circuits. Specifically, the present invention relates to an integrated circuit, such as a microprocessor, which may identify its operating characteristics in order to configure a system employing the circuit.

2. Background Information

It is increasingly a requirement in the design of modern integrated circuits to identify certain operating characteristics of those circuits. As manufacturers produce more and more products, even though such products may be plug-compatible with earlier versions of the products, newer versions of these products may include features which may not have been available in earlier versions. For example, until recently, it has not been feasible to implement certain integrated circuits, such as processors, almost entirely in static logic devices. Most prior art processors have been comprised, for the most part, of dynamic logic devices. In contrast to dynamic logic devices, static logic devices have the capability to retain valid data even after a system clock timing reference has been removed or deactivated. Newer processors using exclusively static logic devices, although plug-compatible (they have the same number of pins and are otherwise functionally compatible) with prior version processors using dynamic logic devices, have no way of informing system software or other components in the system of this additional capability. Thus, power management functions in the basic input/output operating system (BIOS) cannot determine whether it should use a power management function which implements a system clock shutdown or whether it should implement a power management function which slows the system clock to a minimum frequency to allow the circuit to retain valid data. Thus, alternative configurations of a system may be desired depending upon certain parts, such as processors, peripheral components, or other integrated circuits in the computer system, depending upon their identified characteristics.

Other characteristics which have been implemented in newer-generation integrated circuits include features which allow such integrated circuits to operate at lower voltages, those that provide an internal clock rate of twice that of the system clock, and other features which are not normally apparent to system software. Therefore, a means is required which allows an integrated circuit such as a processor to communicate its characteristic information to other integrated circuits, such as a main central processor of a computer system.

In prior art computer systems, characteristic information about the parts in the system must be known by the system installer so that he can configure the system appropriately through software or hardware switch settings. It would be desirable to provide such information directly to a main CPU during an appropriate interval, such as power-up initialization or system bootstrap. There is, thus, a requirement that integrated circuits such as microprocessors provide identifying characteristic information, such as the type of logic devices they are comprised of, to allow computer systems and related software to be automatically configured.

SUMMARY AND OBJECTS OF THE INVENTION

One of the objects of the present invention is to provide a means for self-identification of characteristic information by an integrated circuit.

Another of the objects of the present invention is to provide a means for identifying whether a processor in a computer system is comprised of static logic devices or not.

Another of the objects of the present invention is to provide a means for allowing an integrated circuit such as a processor to identify whether it is capable of operating at a lower voltage level.

Another of the objects of the present invention is to allow an integrated circuit such as a processor to identify an operating characteristic such as whether its internal clock operates at the same speed as a system clock.

Another of the objects of the present invention is to provide a means for transferring such characteristic information from a first integrated circuit, such a coprocessor, to a second integrated circuit, such as a central processor, in order for the central processor to reconfigure the system to operate in the most efficient manner according to the first integrated circuit's operating characteristics.

These and other objects of the present invention are provided for by an apparatus for identifying the characteristics of a single integrated circuit. This apparatus includes a register in the integrated circuit comprising a means for identifying the characteristics of said integrated circuit. One of these characteristics may be whether the integrated circuit includes static logic devices. In such systems, the clock connected to the integrated circuit may be halted, without the corruption of data in the processor. Other characteristics may include whether the integrated circuit is clocked at the same rate as the system, or whether the circuit may operate on a lower voltage power source. The apparatus further comprises a means in the integrated circuit for transferring the contents of said register to a system coupled to said integrated circuit upon the receipt of a first code. The apparatus also comprises a means in the system for receiving the contents of said register and a storage means for storing the contents of said register, and a means in said system for determining the contents of said storage means, such as a logic unit. In this manner, various characteristics of the integrated circuit may be determined and the system reconfigured appropriately.

These and other objects of the present invention are provided for by an apparatus for identifying the characteristics of a single integrated circuit. This apparatus includes a register in the integrated circuit comprising a means for identifying the characteristics of said integrated circuit. One of these characteristics may be whether the integrated circuit includes static logic devices. In such systems, the clock connected to the integrated circuit may be halted, without the corruption of data in the processor. Other characteristics may include whether the integrated circuit is clocked at the same rate as the system, or whether the circuit may operate on a lower voltage power source. The circuit further comprises a plurality of pins interfacing said integrated circuit with other devices including a first pin. A first state (e.g. a high state) on the first pin indicates that the integrated circuit has a first characteristic and a second state (e.g., a low state) on the first pin indicates that the integrated circuit does not have the first characteristic. The apparatus further comprises a control unit in the integrated circuit coupled to said first pin, the control unit having a means for placing said first pin in said first state upon the receipt of a first instruction code and when the contents of the register has a flag with a first state. In this manner, various configuration information in a system using the integrated circuit may be set.

BRIEF DESCRIPTION OF THE DRAWINGS

The present invention is illustrated by way of example and not limitation in the figures of the accompanying in which like references indicate like elements and in which.

DETAILED DESCRIPTION

The present invention describes an apparatus which identifies characteristic information about an integrated circuit. This may include whether a coprocessor comprises static logic devices or dynamic logic devices. Such information may be transferred to other circuitry in a computer system, such a central processor, in order that reconfiguration may be done to allow power management functions to be enabled, such as halting the system clock during instruction idle periods to reduce overall power consumption in the computer system.

The preferred embodiment implements a math coprocessor with many of the standard floating point functions which have been available in prior art math coprocessors. These prior art processors include, but are not limited to, the '87 brand series of math coprocessors available from Intel Corporation of Santa Clara, Calif., such as the 8087, Intel 287™, and Intel 387™ brand math coprocessors (trademarks of Intel Corporation). Although a math coprocessor is discussed for the remainder of this application, it can be appreciated by one skilled in the art that other circuits, such as peripheral controllers, memory controllers, and other devices, may implement the features of the preferred embodiment for providing characteristic information about those circuits.

Figure 1:
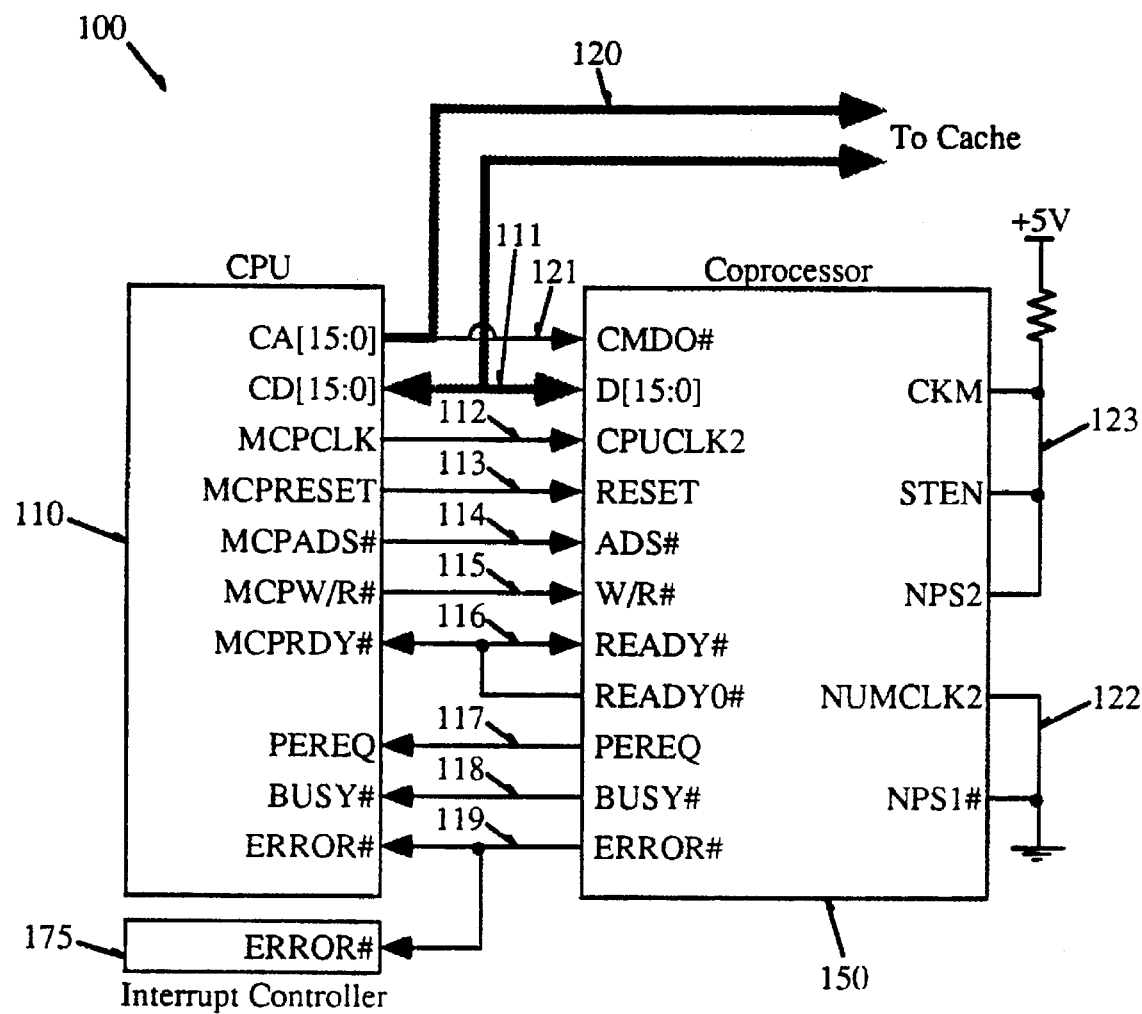
FIG. 1 shows a processor and a coprocessor coupled in a manner similar to that which could be used in a computer system for implementing the methods and apparatus of the preferred embodiment.

The coprocessor of the preferred embodiment is shown as 150 in FIG. 1. 150 may be one of many components included in a system such as 100, wherein 150 may be coupled to a central processing unit (CPU) 110 which performs computations and other functions within system 100. Floating point instructions (those having opcodes within a specified range) are detected by CPU 110 and forwarded to coprocessor 150 via a dedicated I/O (input/output) address (8000F8H) which is outside the normal I/O address range of the system. Any accesses to these locations, therefore, are not decoded as normal I/O addresses by the computer system. Opcodes and other instruction information required by math coprocessor 110 are transmitted via pins CD[15:0] by CPU 110 over data lines 111. Lines 111 are further coupled to a cache (not shown) in system 100 to allow for normal data read and write operations to the cache and, thus, to main memory by CPU 110. Note also that address pins CA[15:0] of CPU 110 are coupled to an address cache via lines 120 shown in FIG. 1. One of these lines 121 is connected to pin CMD0# on coprocessor 110, which is tapped from the address lines 111 to math coprocessor 150. (Note that for the remainder of this application, a signal name followed by a "#" at the end of signal name indicates that the active or asserted state of the signal occurs when the signal is at a low voltage. The absence of a "#" after the signal name indicates that the signal is asserted when at the high-voltage level.) This line is used for indicating whether, during a write cycle, an opcode or data is being transmitted to math coprocessor 150.

Line 112 couples the pin CPUCLK2 of coprocessor 150 to a timing reference MCPCLK on CPU 110. Line 113 couples reset line MCPRESET on CPU 110 to the math coprocessor pin RESET. CPU 110 address strobe signal pin MCPADS# is coupled via 114 to the strobe line of the coprocessor ADS#. In addition, the CPU read/write bus cycle signal pin MCPW/R# is coupled via 115 to W/R# of coprocessor 150. The signal pin READY0# on coprocessor 150 is coupled via lines 116 to the CPU ready line MCPRDY# and to READY# of the coprocessor.

The preferred embodiment also allows coprocessor 150 via line 117 to assert a processor request to processor 110 via pin PEREQ. The math coprocessor can indicate to the processor, via line 118, that it is currently executing an instruction using the BUSY# signal pin. And, if an error condition occurs, this may be indicated by asserting the signal contained on pin ERROR# via line 119 which is passed to interrupt controller 175 shown in FIG. 1. ERROR# is also used for indicating that coprocessor 150 is present in the system to CPU 110 during system reset intervals to allow the CPU and system to use features provided by coprocessor 150.

Figure 2:
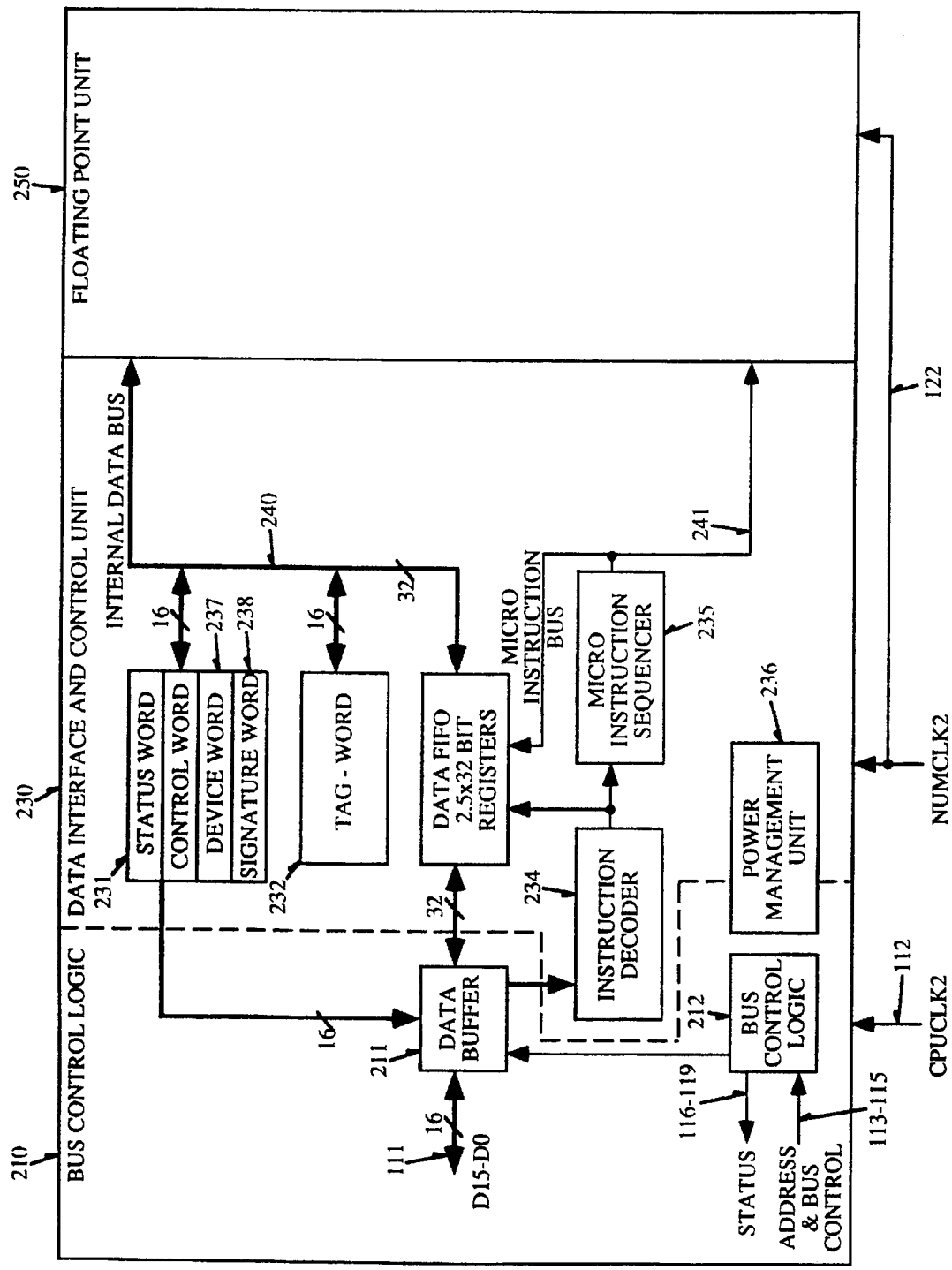
FIG. 2 shows a detailed view of a coprocessor of the preferred embodiment.

A more detailed view of coprocessor 150 is shown in FIG. 2. Coprocessor 150 comprises three main sections: bus control unit logic 210, data interface and control unit 230, and floating point unit 250. 210 provides interfacing with CPU 110 shown in FIG. 1. 210 comprises a data buffer 211 which accepts as inputs the data lines 111 for receiving information from CPU 110. 210 also comprises bus control logic 212 which accepts as inputs lines 113–115 and 122–123 for address and bus control logic and is responsive with outputs over lines 116–119 for status of coprocessor 150. Bus control logic 210 uses as a timing reference the signal from MCPCLK on processor 110 provided over line 112 as is shown in FIGS. 1 and 2.

A second section of math coprocessor 150 is data interface and control unit 230. The remaining portions 230 and 250 may have an alternative timing reference NUMCLK2 which is provided over lines 122 as shown in FIGS. 1 and 2. However, in the embodiment shown in FIG. 1, this line is tied to ground, and the coprocessor, thus, uses timing reference CPUCLK2 received over line 112. Data interface and control unit 230 comprises status and control words 231, tag word 232, device word 237, signature word 238, and data FIFO 233 which are all coupled to internal data bus 240. The data FIFO is also coupled to data buffer 211 of bus control logic 210 to allow transfer of data, such as operands, to and from CPU 110. Internal data bus 240 is further coupled to floating point unit 250 for performing various floating point calculations. Status and control words 231, device word 237, and signature word 238 may also be placed on internal data bus 240 or directly into data buffer 211 for transmission to CPU 110 shown in FIG. 1. Tag word 232 may also be available to the data FIFO 233 or, alternatively, for use by floating point unit 250 via internal data bus 240.

Data interface and control unit 230 also comprises instruction decoder 234 and micro instruction seqeuncer 235. Instruction decoder 234 issues instructions, as necessary, to floating point unit 250 via micro instruction bus 241 or, alternatively, place data into FIFO 233 or data buffer 211. For example, certain instructions in the preferred embodiment places constant data such as device or signature words 237 and 238 containing characteristic information about processor 150 through data buffer 211 to lines 111 for reading by CPU 110 or other external circuitry. In this way, various information regarding the processor may be determined by CPU 110, and system 100 may be reconfigured in an appropriate manner.

Figure 3:
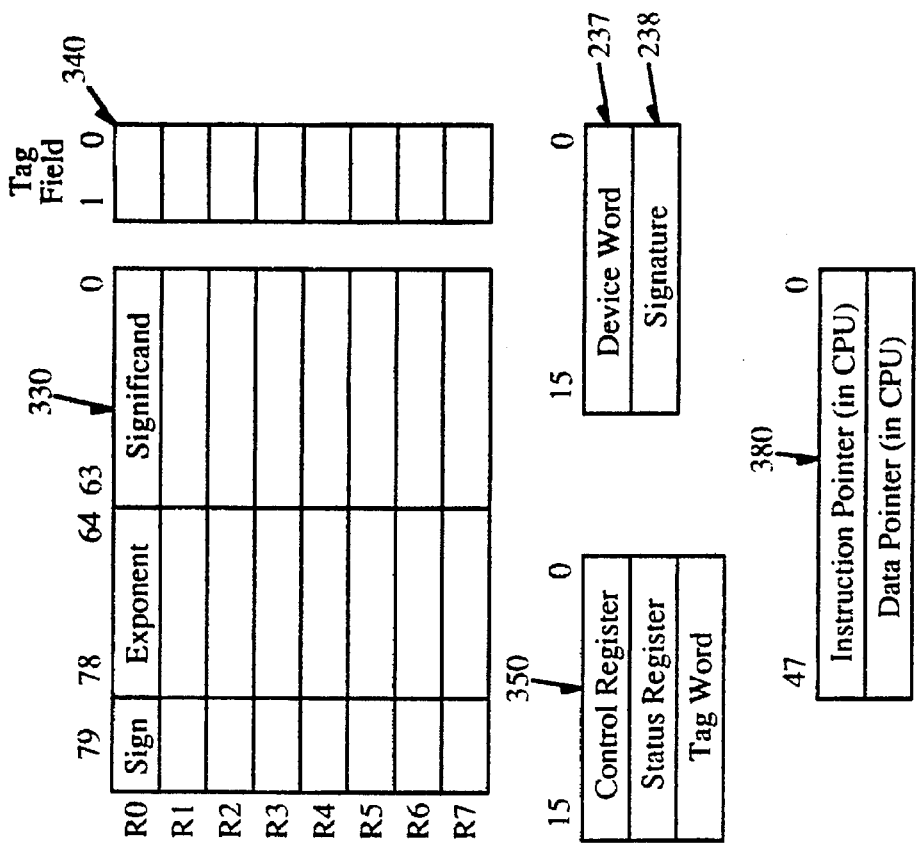
FIG. 3 shows main processor registers which are suitable for receiving the contents of a device word register from the coprocessor and registers in the coprocessor.
Figure 3:
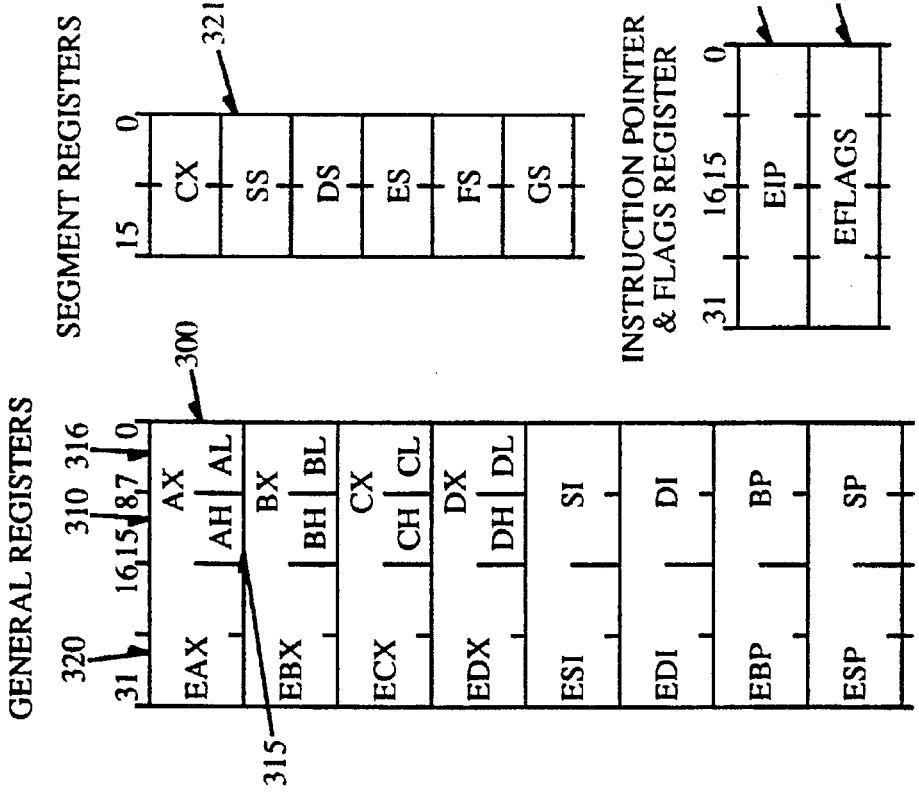

FIG. 3 shows a summary of the registers in both CPU 110 and coprocessor 150. As is shown in FIG. 3, the processor comprises general purpose registers, such as register 300, which comprises 16-bit AX register 310, and its extended register EAX 320. Further, the AX register 310 is separated into two portions, AH 315 and AL 316 for the high and low bits of the register, respectively. Central processing unit 110 further comprises 16-bit segment registers 321 and the flags and instruction pointer registers 322 and 323. Coprocessor 110 comprises eight general purpose 80-bit registers 330 for storing sign, exponent, and significand of the various values being used for calculations. In addition, each of the registers has associated with it a 2-bit tag field shown as 340 in FIG. 3.

Also, as shown in FIG. 3, coprocessor 150 comprises control, status, and tag registers 350. Note that many of the above-mentioned registers are in use in existing microprocessors such as the Intel 386™ and Intel 387™ (trademarks of Intel Corporation) brand microprocessors available from Intel Corporation of Santa Clara, Calif., and the use of these registers is well-known to those skilled in the art. The preferred embodiment, however, provides two additional registers which are novel. Specifically, these include device word register 237 and signature word register 238. These two registers are stored in nonvolatile memory of coprocessor 150 such that, when an instruction is decoded requesting information from one of these two registers, that the information is subsequently provided over lines 111 to CPU 110. Specifically, the preferred embodiment provides for device word register 237 stored in nonvolatile memory which identifies certain operating characteristics of coprocessor 150. Also, signature word register 238 comprises information regarding the version and stepping of particular coprocessor or chip 150 which is being used which may also be provided on lines 111. These registers may be useful for quality control and/or determining whether certain features are supported by the attached version of the chip. This may allow run-time reconfiguration of software to allow the hill use of all features supported by each chip, including power management functions.

Figure 4:
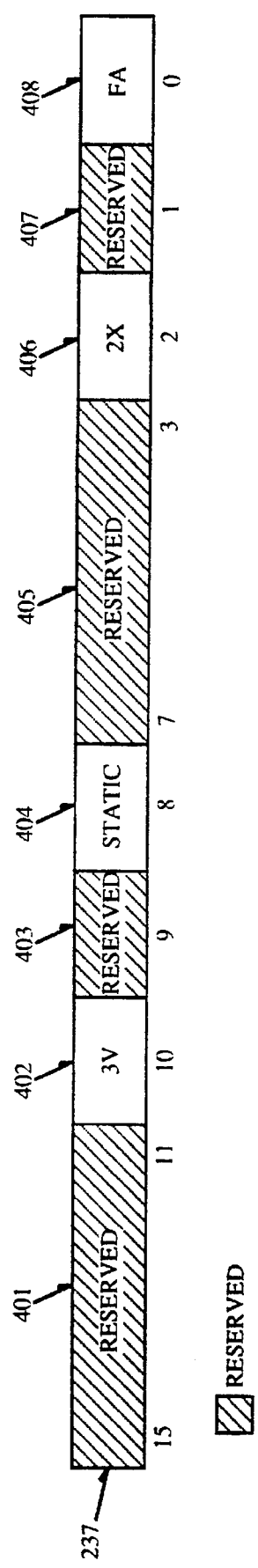
FIG. 4 shows a detailed view of the device word register.

Device word register 237 is shown in more detail with reference to FIG. 4. FIG. 4 shows a detailed description of the structure of one embodiment of the present invention. Device word register 237 discussed with reference to FIG. 4 may contain any or all of the flags shown in FIG. 4. For example, in the preferred embodiment of the present invention, the entire device word register 237 is reserved, except for static flag 404 shown at bit position 8 in device word 238. However, it can be appreciated by one skilled in the art that other identifying flags, such as those shown in FIG. 4, may be used in a device word of a circuit of an alternative embodiment.

The device word register shown in FIG. 4 as 237 comprises several bits describing the characteristics of processor 150. Although this particular word has been described for use in a math coprocessor such as 150, it can be appreciated by one skilled in the art that this word may be used for describing other operational characteristics of other integrated circuits. Thus, by determining whether certain flags in the register are set or not, software such as a system BIOS (basic input/output system) can determine the features of this coprocessor and reconfigure the system appropriately.

Three flags are shown in device word 237 are used for identifying the operating characteristics of processor 150 in various embodiments. The first is static flag 404 which resides at bit position 8 in device word 237. As was discussed above, this particular flag is an active-high flag such that when the bit is set, it indicates that processor 150 is comprised entirely of static logic devices. In such a device, the system clock provided to this processor may be halted, such as that provided over line 122 or 112, thus reducing power consumption by processor 150. This type of processor will retain valid data even after the system clock is no longer providing a timing reference to coprocessor 110. In contrast, a circuit not having such a bit set may be comprised of dynamic logic components. In this case, the clock must be kept active or reduced to some minimum frequency to allow valid data to be retained. In circumstances where the word is comprised of static logic devices as detected by a high state of flag 404, the clock can be halted or no longer provided to coprocessor 150 without corrupting the internal store, stack, or other registers in coprocessor 150.

Device word 237 shown in FIG. 4 also comprises 3.3-volt flag 402 in bit position 10. This indicates that the processor supports a 3.3-volt mode as opposed to the standard 5 volts used by most prior art processors. In certain portable applications, it is desirable to have a processor which requires a 3.3-volt power source. The 3.3-volt mode may be tested for and the system reconfigured appropriately to operate at the lower voltage to conserve power.

Device word 237 also comprises a clock double flag "2X" 406, which is present in bit 2 of the word. This flag, when set, indicates that the internal operating frequency of the device is twice that of the system clock frequency. Thus, in a system having a 25-MHz system clock, the coprocessor will operate internally at 50 MHz. In a system having a 33-MHz system clock, the coprocessor will operate at 66 MHz. When flag 406 is set, a clock doubling processor is present, when clear, the processor operates internally at the normal system clock rate.

Device word 237 of the preferred embodiment lastly comprises FA flag 408 present at bit position zero. This flag indicates that processor 110 is capable of operating in an alternative mode utilizing instructions not compatible with the prior art. The mode of the preferred embodiment indicated by FA flag 408 allows software to be configured in such a way to allow this alternative mode to be used which increases the performance of the coprocessor.

The remaining fields in positions 401, 403, 405, and 407 comprising bit positions 1, 3–7, and 11–15 are currently reserved for future use. The system programmer cannot, therefore, rely upon those bit positions for providing any useful information in the current described embodiments.

In addition to the register provided in the coprocessor of the preferred embodiment for identifying certain operating characteristics, processor 110 and coprocessor 150 now include defined instructions for loading device word register 237 into the AX register of CPU 110. Upon the detection of the instruction, the coprocessor 150, via instruction decoder 234, will provide the device word to data buffer 211, and then on pins coupled to lines 111 for reading by processor 110. Thus, once the data has been received from the coprocessor, it is placed, using conventional prior art techniques, into the AX register shown as 310 in FIG. 3. These two new instructions are shown in Table 1 below:

TABLE 1

FSTDW/FNSTDW-Store Device Word Register

| Opcode | Instruction | Clocks | Description |
|---|---|---|---|
| 98 DF E1 | FSTDW AX | 13 + at least 6 for FWAIT | Store device word from coprocessor to AX register in CPU after checking for unmasked floating point errors. |
| DF E1 | FNSTDW AX | 13 | Store device word from coprocessor to AX register in CPU without checking for unmasked floating point errors. |

Instruction decode and execution is perforated in a conventional manner as prior art load and store instructions which check for unmasked floating point errors occurring in appropriate circumstances. Note that the appropriate instruction may be issued and executed by the computer system under control of a system BIOS during system bootstrap or power-up initialization. Note that, because of the requirement to remain backward compatible with prior versions of the math coprocessor, these commands provide valid data in the AX register of central processing unit 110 only after the initialization instruction FINIT has been issued to the coprocessor and prior to modification of the status word register (e.g., contained in 350 of FIG. 3) in coprocessor 150. Prior versions of the coprocessor will transfer the contents of the status word register upon receipt of the opcode for the FSTDW or FNSTDW instruction, however, it can be appreciated by one skilled in the art that this limitation need not be present on other integrated circuits implementing this feature. Thus, once the command has been issued after FINIT and prior to the modification of the status word, the AX register may be tested by an appropriate instruction in CPU 110, and it may be determined, for example, whether the coprocessor is comprised of static logic devices or dynamic logic devices. This is exemplified by the brief assembly language code segment as follows:

fstdw ax
   sahf
   inc non__static__mcp;

This code segment determines whether the device is comprised of static logic components or not by testing flag 404. This set of instructions does not use the other flags in device word 237 such as 402, 406, or 408. Note that, in alternative embodiments, these flags may be checked as well for other configurations of the computer system. Via the command fstdw ax code segment, the AX register in CPU 110 is first loaded with device word 237 contained in coprocessor 150. Via the sahf instruction, the routine stores the high word portion, shown as AH 315 of the AX register 310 shown in FIG. 3, into the EFLAGS register 323. Thus, bits 8-15 of the AX register are stored into the E register aligned with the zero or least significant bit. Now, static flag 404 resides in the "carry" field of the EFLAGS register 323, and the process tests whether that bit, defined as the "carry" bit in a typical prior art processor, such as the Intel 386™, is not set. If not set, then the jnc instruction (jump no carry) may be executed, as is shown in the code segment, to branch to a routine "non__static__mcp." This routine then configures the system to operate with a coprocessor comprised of dynamic components. In power-saving modes initiated by the main central processor, in this case, the system clock timing reference provided to coprocessor 150 cannot be removed. An alternative technique can be used in this case, such as slowing the clock to some minimum frequency. If it has been determined that the circuit is comprised of static logic components by the foregoing or similar method, then the clock can be halted during power saving intervals without corruption of the stack or internal store of coprocessor 150.

Note that the foregoing example is shown for illustration purposes only and in no way limits the scope of the present invention. Note that other commands or sequences of instructions may be used for testing the various flags contained in device word 237 so that various operating parameters may be set in the computer system. Methods similar to the code segment discussed above may be done for the other flags such as 402, 406, or 408 in alternative embodiments employing device word register 237.

Thus, an invention for determining the characteristics of an integrated circuit device, such as a processor or coprocessor, has been described. In the foregoing specification, the present invention has been described with reference to specific embodiments thereof in FIG. 1 through 4. It will, however, be evident that various modifications and changes may be made thereto without departing from the broader spirit and scope of the present invention as set forth in the appended claims. The specification and drawings are, accordingly, to be regarded in an illustrative rather than a restrictive sense.

What is claimed is:

1. A processor comprising:
   a. a register in said processor including a contents having a plurality of flags including a first flag for internally identifying characteristics of said processor;
   b. a control unit in said processor coupled to said register, said control unit including an activation circuit for activating a first line upon the receipt of a first instruction code sent by a second device and when said first flag has a predetermined state; and
   c. a plurality of pins coupled to said control unit for interfacing said processor with said second device including a first pin coupled to said first line, a first state on said first pin externally indicating that said processor has a first characteristic and a second state on said first pin externally indicating that said processor does not have said first characteristic.

2. The processor of claim 1 wherein said characteristics include whether or not said processor includes static logic devices.

3. The processor of claim 1 wherein said characteristics include whether or not said processor can operate from a 3.3 or 5 volt power source.

4. The processor of claim 1 wherein said characteristics include whether or not said processor is internally clocked at a rate other than a predetermined rate.

5. The processor of claim 1 wherein said characteristics include whether or not said processor is capable of operating in an alternative mode.

6. The processor of claim 1 wherein said control unit includes an instruction decoder coupled to said register for decoding said first instruction code.

7. A processor capable of communicating a set of operating characteristic information upon receiving a first instruction code sent by a second device, said processor comprising:
   a. a register in said processor including a contents having a plurality of flags for internally identifying said set of operating characteristic information, wherein said set of operating characteristic information includes a first operating characteristic and said plurality of flags includes a first flag;

b. a plurality of pins coupled to said register for interfacing said processor with said second device including a first pin, a first state on said first pin externally indicating that said processor has said first operating characteristic of said set of operating characteristic information and a second state on said first pin externally indicating that said processor does not have said first operating characteristic of said set of operating characteristic information; and c. a control unit in said processor coupled to said first pin, said control unit having an activation circuit coupled to said first pin for activating said first pin upon the receipt of said first instruction code and when said first flag has a predetermined state indicating that said processor has said first operating characteristic of said set of operating characteristic information.

8. The processor of claim 7 wherein said set of operating characteristic information includes whether or not said processor includes static logic devices.

9. The processor of claim 7 wherein said set of operating characteristic information includes whether or not said processor can operate from a 3.3 or 5 volt power source.

10. The processor of claim 7 wherein said set of operating characteristic information includes whether or not said processor is internally clocked at a rate other than a predetermined rate.

11. The processor of claim 7 wherein said set of operating characteristic information includes whether or not said processor is capable of operating in an alternative mode.

* * * * *